Dec. 24, 1929.  A. R. GOLRICK  1,740,979
METHOD OF MIXING PIGMENTS
Filed March 5, 1927  3 Sheets-Sheet 2

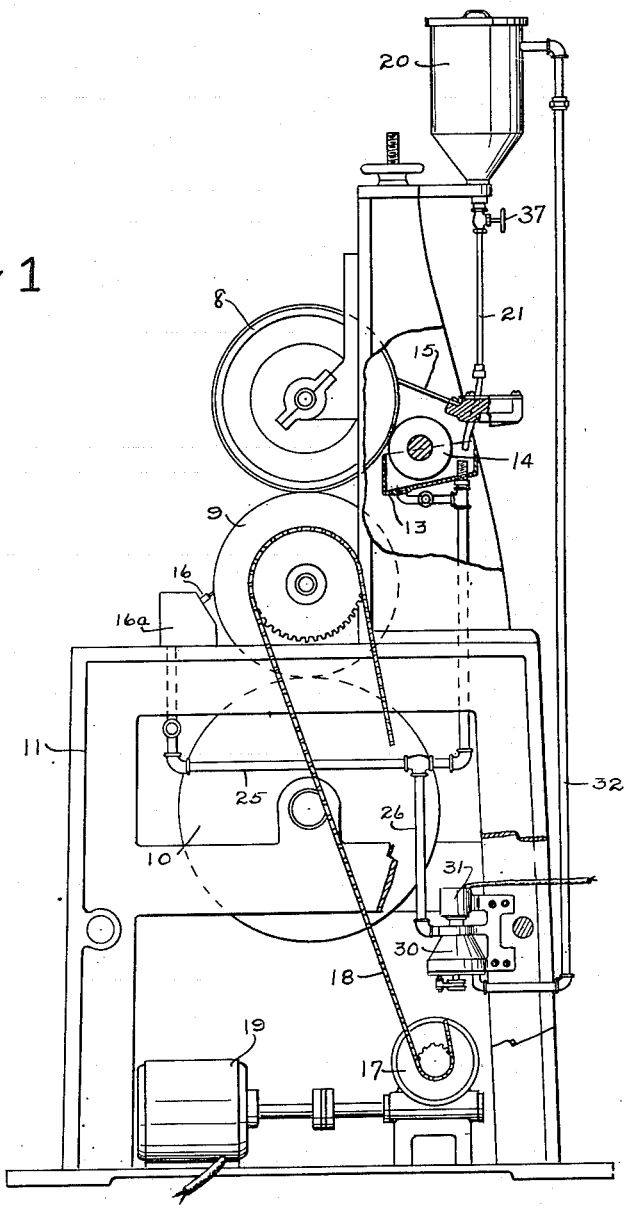

Inventor
Albert R. Golrick
By Bates, Macklin, Golrick & Teare
Attorneys

Dec. 24, 1929.   A. R. GOLRICK   1,740,979
METHOD OF MIXING PIGMENTS
Filed March 5, 1927   3 Sheets-Sheet 3

Patented Dec. 24, 1929

1,740,979

UNITED STATES PATENT OFFICE

ALBERT R. GOLRICK, OF CLEVELAND, OHIO, ASSIGNOR TO THE MIDLAND BANK, TRUSTEE, OF CLEVELAND, OHIO, A CORPORATION OF OHIO

METHOD FOR MIXING PIGMENTS

Application filed March 5, 1927. Serial No. 173,146.

This invention is directed to the provision of the method of and an apparatus for maintaining a uniform homogeneous consistency of pigments when applied to objects to be coated or impressioned by machinery, and has for its general object the provision of a process which utilizes a circulatory system embodying cooperative features for maintaining a liquid pigment in constant circulation when being used in a coating, dipping or printing machine, and which process includes imparting to the circulating pigment an emulsifying action, not possible by the use of ordinary pigment circulating pumps, the process serving also to prevent variation in the consistency of the pigment and precipitation of the heavier materials therein, and also which will serve to replace the loss of volatile solvents from the pigments and while the pigments are in use.

A further object of my invention is the provision of a process for preventing sudden and unexpected disintegration or breaking down of mechanically emulsified baking japans or varnishes such as "water japan".

Other objects of my invention will hereinafter become apparent from the following description which refers to the accompanying drawings, the latter illustrating various apparatus for fulfilling the novel steps of my process. The essential characteristics are summarized in the claim.

Figure 3:
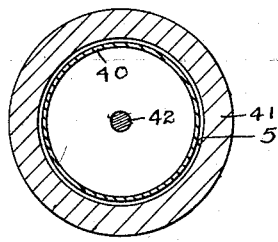
Figure 2:
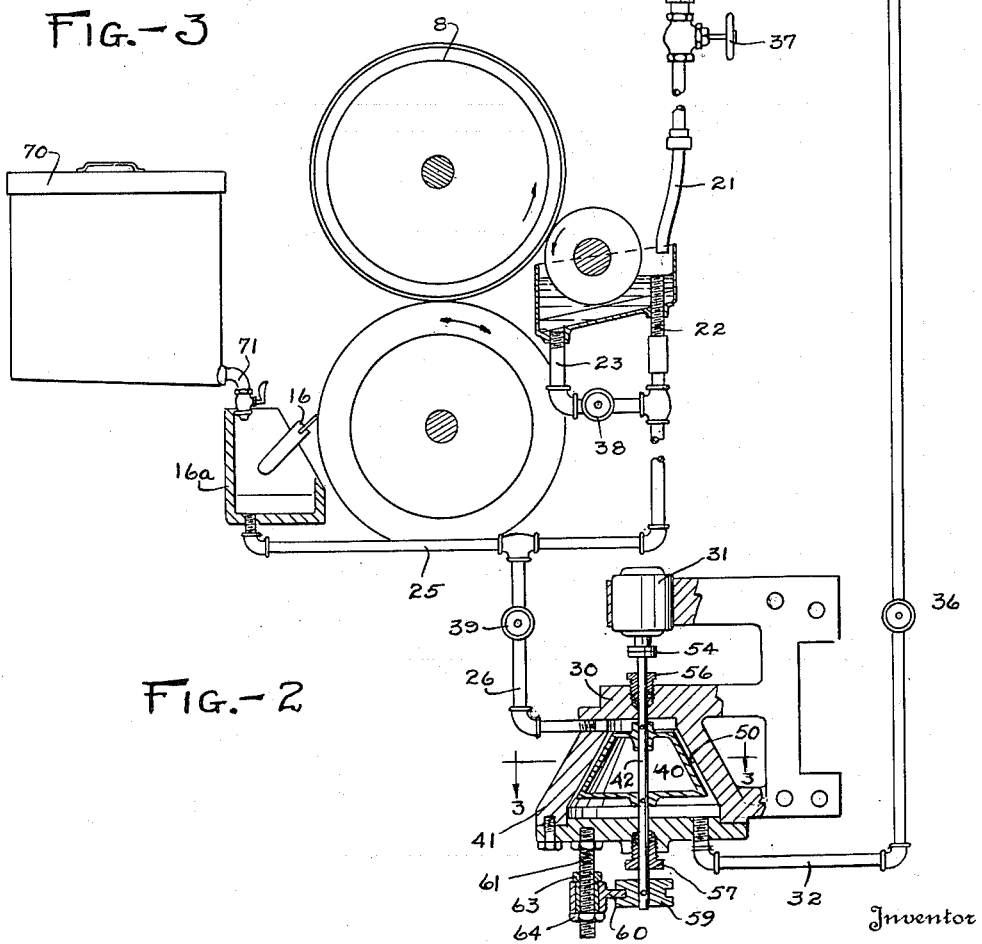
Figure 4:
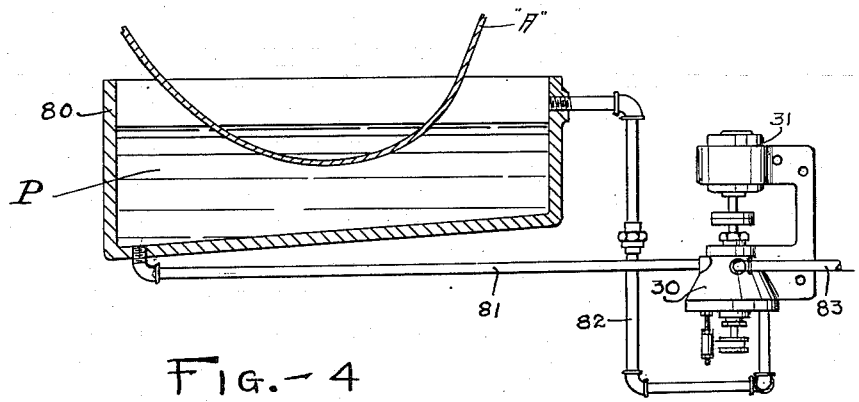
Figure 5:
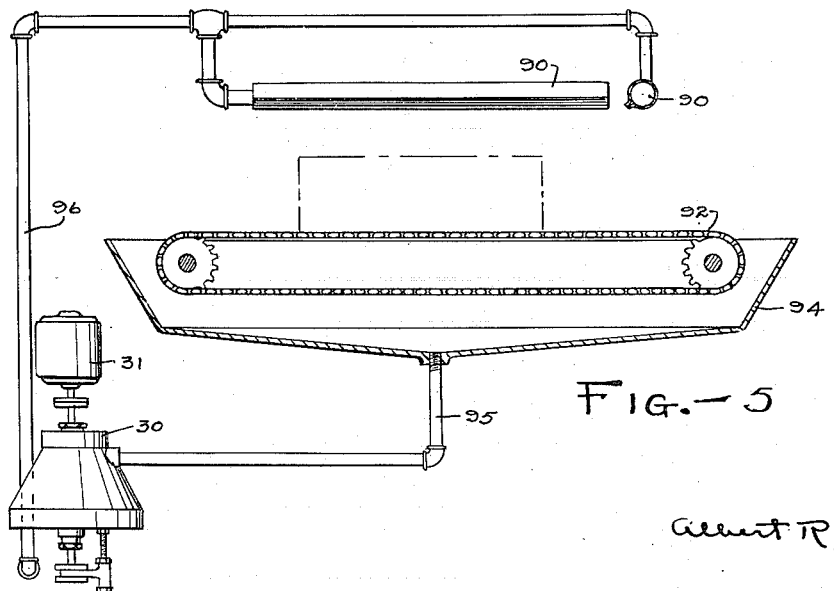

In the drawings Fig. 1 illustrates a side elevation of an intaglio printing machine equipped with a novel apparatus for fulfilling the novel steps of my process; Fig. 2 is a diagrammatic representation of a pigment conduit system adapted to the maintaining of the uniform consistency of a pigment or ink which has a tendency to thicken due to the loss of volatile suspending mediums; Fig. 3 is a cross sectional detail taken substantially along the line 3—3 of Fig. 2; Fig. 4 is an adaptation of my invention to the method of coating objects with liquid pigments by dipping the objects in an open tank; Fig. 5 illustrates more or less diagrammatically an adaptation of my invention to a machine adapted to coat objects by the constant splash or stream flow method.

My invention contemplates the use of a method which will maintain a constant circulation of the pigment through a machine which is applying the pigment to the object to be coated or impressioned, that is, the pigment is constantly drawn away from the place of application to the object and passed through a circulating system, the system being directed to the maintaining of a continuous emulsifying action upon the pigment and which system returns it to the place of application in the machine.

In Fig. 1 I show an example of the adaptation of my system to an intaglio printing machine which may comprise a photogravure roll 8 and a transfer impression roll 9 in contact therewith. A work supporting roll 10 is positioned between the impression roll 9 and the pattern is transferred from the intaglio roll 8 to the work as it passes between the impression roll 9 and the supporting roll 10. A suitable machine frame 11 supports these rolls in combination. An inking fountain is shown at 13, having a roll 14 which applies the pigment to the intaglio roll 8. A doctor blade 15 scrapes the surplus ink 15 from the intaglio roll 8 as the latter roll is rotated, and this surplus ink drops back into the fountain 13. At 16 is shown a cleansing apparatus for removing and scraping clean the transfer roll 9 at a position following the contact of the transfer roll with the work to be impressioned.

The rolls may be driven in any convenient manner and in Fig. 1 I show a chain drive 18 driven by a motor 19 through a set of reduction gears 17.

The ink or pigment is maintained in constant circulation through a conduit system which includes a reservoir or storage tank 20, a gravity feed pipe 21 leading to the ink fountain 14, an overflow pipe 22 and a fountain draining pipe or branch 23. The pipe 22 may be joined to a drain pipe 25 connected to the roll cleaner tray 16ª and these last two named pipes are drained by a pipe 26 leading to a combined pump and emulsifying apparatus 30 which is preferably driven by an independent motor 31. The action of the apparatus will be hereinafter described in detail, but leading from the apparatus 30 is a pipe line 32 for conducting the pigment, after it passes through the apparatus 30, to the top of the storage tank 20. The tank 20, if desired may contain a screen 35 for trapping any foreign matter which may inadvertently become involved in the conduit system at the open places thereof, such as the ink fountain and cleaner tray. The conduit system is provided with flow regulating valves 36, 37, 38 and 39 disposed at strategic places for regulating the flow of the pigment to the ink fountain and emulsifying apparatus.

The use of the process in the particular environment is found to be quite advantageous where inks or pastes are used that have vitreous characteristics whereby the article being printed is subsequently subjected to a baking temperature to give a vitreous enamel finish. Such inks or pastes differ from ordinary inks in that they usually have a silicon or equivalent element base, which, when burned or baked will glaze and maintain the desired color. Such inks or pastes however, have a high specific gravity and are difficult to maintain in a uniformly consistent state when in use. The use of my process, however, serves to maintain the paste in a homogeneous condition in that the liquid medium can be constantly fed into the circulating system in direct proportion to the volatile and liquid loss without necessitating any delays in the use of the machine.

The emulsifying apparatus 30 may comprise a rotor 40 disposed within a casing 41 and mounted upon an extension 42 of the shaft of the motor 31. The interior shape of the casing 41 and the relative shape of the rotor 40 are such as to cause a sucking action upon the pigment and accordingly the rotor 41 may have a coniform shape as shown in Fig. 2 and the interior of the casing may have a complementary shape whereby when the rotor 40 is adjusted in a direction longitudinally of the shaft axis the space 50 may be varied as desired. This adjustment may be accomplished in any suitable manner and for the purpose I prefer to provide a slip connection 54 whereby the motor 31 may be permanently mounted and the shaft extension 42 may extend through bearing bores in the casing 41 which bores are provided with packing glands 56 and 57 to prevent the loss of pigment from the conduit system and the ingress of air to the rotor during its emulsifying action on the pigment in circulation within the system.

Mounted upon an outer end of the rotor shaft 41 is an adjustment spool 59 engaged by a non-rotating forked member 60, the latter member being supported by a screw stud 61 depending from the casing 41. Binding nuts 63 and 64 serve to maintain the fork member 60 in a rigid adjusted position. It will be noted that the conduit line or pipe 26 enters the casing at the smaller end of the rotor, namely the suction end of the rotor and the pipe 32 is connected to the casing at the force or exit end of the casing.

The motor 31 may be of the high speed type with resistance controller whereby its speed may be varied in accordance with the nature of the fluid passing through the pigment applying machine and in accordance with the amount of adjusted space between the casing wall and the rotor.

Another typical installation of the foregoing described system embodies a solvent or liquid medium tank 70 provided with a valve 71 for permitting the constant addition or replacement of lost volatile matter, such for example, as alcohol from pigment having a shellac carrier. When replaced at the point shown in Fig. 2, the alcohol becomes thoroughly mixed as it passes through the apparatus 30 and before the pigment again reaches the storage tank.

In Fig. 4 I show the application of my system to a dipping tank when the article "A" is being coated by immersing the article in the liquid pigment P within the tank 80. The bottom of the tank may be tapered to prevent the accumulation of sediment, and the suction line 81 of the conduit system is connected to the tank at the lowermost point thereof. The apparatus 30 may be placed at any convenient position relative to the tank, and the force line 82 leading therefrom may connect to the tank, at or adjacent to the level of the liquid pigment therein. This general arrangement, it will be found, is adaptable to the maintaining of a uniform consistency in japans and varnishes when there is a tendency for the mixture to break down and to coagulate or gum. The apparatus 30, as shown in Fig. 4 is provided with an additional connection 83 leading into the casing at the suction end of the rotor for the injection of solvents. When "water japan" is being passed through the system the injection of steam is sometimes desired to recondition the emulsion. It is well known that the water emulsion known as "water japan" has a tendency to break down or gum when coming in contact with so called electrolytic metals such as brass, copper etc. and accordingly a system provided for use in connection with dipping tanks containing "water japan" should not embody any parts contacting with the japan which are formed of the so called electrolytic metals. In the event the liquid begins to thicken due to extraneous contacts detrimental to its emulsified state, such for example as foreign gases, brass dust particles etc. it will be rapidly restored as it constantly passes through the conduit system, but if a severe coagulation begins to form the introduction of steam through the duct 83 will serve to greatly assist in the restoration of the emulsion. The introduction of this steam should be accomplished however without permitting the ingress of air to the emulsifying chamber of the casing. The success of the process when used in connection with the application of water japans to articles is found in the fact that when the disintegrating action starts to progress in the japan, it is immediately arrested by the restoration of the disintegrating particles as the japan circulates. In other words by continuously circulating the japan to and from the place of application and while doing so, constantly subjecting it to an emulsifying action and inspection on the part of the operator to obtain uniformity of application of the coating to the article.

In Fig. 5 I show a third adaptation of my system. In this instance the system is shown in connection with a splash or constant stream coating machine wherein the pigment is ejected through elongated nozzles 90 in the form of flat streams against the object (indicated by the dot and dash lines) on the conveyor 92. The surplus pigment drains into a drip pan 94 from which it passes through line 95 to the apparatus 30. The apparatus (or an additional pump) forces the remixed pigment through the line 96 to the nozzles 90.

The method described herein is adaptable to a variety of pigment applying mechanisms as will be readily understood and the apparatus is quite flexible in its adaptability to such mechanisms, and its use affords great economies, in that pigments otherwise satisfactory were prohibitive in industrial plants due to the rapid changes in the consistency thereof when exposed in volume in dipping tanks, flow machines, etc.

I claim:

The method of applying liquid coatings to objects which it is desired to coat, which comprises applying a surplusage of the liquid coating to the object in the presence of air, retrieving said surplusage, maintaining a continuous movement of the liquid material through a conduit system which is adaptable to the application of said surplusage of liquid material to the object to be coated, and preserving a uniform consistency of the liquid at the point of coating application by introducing a percentage of solvent medium corresponding to the amount of solvent lost due to evaporation or wastage and constantly emulsifying the continuously moving coating material at a point in the conduit system intermediate the point of liquid application and the point of solvent introduction.

In testimony whereof, I hereunto affix my signature.

ALBERT R. GOLRICK.